United States Patent [19]

Berger

[11] Patent Number: 5,586,861
[45] Date of Patent: Dec. 24, 1996

[54] AIRFLOW MEASURING CENTRIFUGAL FAN

[75] Inventor: Thomas A. Berger, Portland, Oreg.

[73] Assignee: Pace Company, Portland, Oreg.

[21] Appl. No.: 252,192

[22] Filed: Jun. 1, 1994

Related U.S. Application Data

[63] Continuation-in-part of Ser. No. 63,013, May 17, 1993, abandoned.

[51] Int. Cl.[6] .................................................. F04D 29/00
[52] U.S. Cl. ........................................ 415/118; 415/182.1
[58] Field of Search ............................... 415/118, 182.1, 415/183, 208.1

[56] References Cited

U.S. PATENT DOCUMENTS

| | | |
|---|---|---|
| 1,490,976 | 4/1924 | Huff . |
| 1,831,218 | 11/1931 | Winter et al. . |
| 1,897,858 | 2/1933 | Peck . |
| 2,922,431 | 1/1960 | Jensen . |
| 3,650,633 | 3/1972 | Benoit . |
| 4,228,753 | 10/1980 | Davis et al. . |
| 4,859,140 | 8/1989 | Passadore . |

FOREIGN PATENT DOCUMENTS

| | | |
|---|---|---|
| 0280911 | 9/1988 | European Pat. Off. . |
| 2581 | 3/1989 | European Pat. Off. . |
| 419798 | 4/1991 | European Pat. Off. . |
| 1229347 | 11/1966 | Germany . |
| 2242515 | 3/1974 | Germany . |
| 8911433 | 1/1990 | Germany . |
| 12298 | 3/1901 | United Kingdom . |
| 858808 | 1/1961 | United Kingdom . |
| 92/22791 | 12/1992 | WIPO . |

OTHER PUBLICATIONS

Publication entitled "The Air Monitor VOLU–probe™/F—Fan Inlet Airflow Traverse Probes," 6 pages, Air Monitor Corporation, Santa Rosa, California, copyrighted 1987.
ANSI/AMCA Standard 210–85, ANSI/ASHRAE Standard 5–1985.

*Primary Examiner*—John T. Kwon
*Attorney, Agent, or Firm*—Klarquist Sparkman Campbell Leigh & Whinston

[57] ABSTRACT

A centrifugal fan is provided with an inlet cone that serves to measure air flow through the fan. The inlet cone has a flared inlet for receiving air, a narrow throat, and a flared outlet for expelling air into the center of a rotating fan wheel. Pressure taps are provided to measure the static pressure at the inlet and the throat. The difference between these pressures, adjusted for the empirically determined characteristics of the inlet cone, can be used as an indication of air flow. In one aspect of the invention, a controller monitors the pressure differential, calculates a flow rate based on the characteristics of the cone, and adjusts the fan speed to maintain a desired air flow.

12 Claims, 3 Drawing Sheets

AIRFLOW MEASURING CENTRIFUGAL FAN

This is a continuation-in-part of application Ser. No. 08/063,013, filed May 17, 1993 now abandoned.

BACKGROUND OF THE INVENTION

1. Field of the Invention

This invention relates to ventilation systems, and particularly to a system for measuring the flow of air through commercial ventilation systems, including those with centrifugal fans.

2. Description of Related Art

Ventilation systems in many commercial settings are required, either by code or by functional specifications, to have a certain minimum flow rates. For example, in commercial buildings, a minimum level of air flow is required to maintain a healthy air quality within the building. Similarly, in other applications, such as clean rooms, a certain level of air flow must be maintained to allow adequate filtration and removal of airborne particulates.

To ensure that the air flow requirements for a particular system are met, it is advantageous to be able to precisely measure the rate of air flow through the system. Systems without precise flow measuring capability are frequently overdesigned to have excess capacity, and are frequently operated at excess levels to ensure compliance with operating specifications. This adds unnecessarily to the expense of both the systems and their operation.

In addition, filters used in some systems can become clogged with particulates, making them more resistant to air flow over time. This increased resistance may cause the air flow of the system to drop below acceptable levels unless it is precisely monitored and steps are taken to compensate for the increased resistance.

Unfortunately, many methods of measuring air flow in a ventilation system can dramatically decrease the efficiency of the system. The efficiency of a ventilation system is a measure of how readily air flows through the system or, conversely, the system's resistance to air flow. Each component of a system through which air flows presents a certain amount of resistance to air flow. This resistance is determined by the size and shape of the component, and by the nature of any obstacles or surfaces over which the air flows. Generally, components that are wider, smoother, straighter and shorter have less resistance to air flow, and therefore provide a more efficient system.

Improved efficiency can permit the use of a lower capacity fan to generate a given level of air flow in a system, and can require less energy to maintain a given level or air flow. In this manner, improving the efficiency of a ventilation system can reduce both the equipment and operating costs for the system. Many systems for measuring airflow, however, have just the opposite effect. Many flow measuring systems increase a system's resistance to air flow, and thereby reduce the system's efficiency.

Existing air flow measurement systems have had to balance the trade-offs between efficiency and precision of measurement. Existing measurement systems typically create an obstruction or constriction within the air flow, and measure the effect of the obstruction or constriction on the air pressure at a certain point in the system. Increasing the size of the obstruction or amount of the constriction generally increases the precision of the flow measurements but also increases the negative impact of the measuring system on the system efficiency.

A pitot tube measuring system is an obstruction-type measurement device. A typical pitot tube has an orifice facing directly upstream to provide a total pressure measurement and an orifice oriented to provide a static pressure measurement. From this information, the velocity of the air stream can be determined. The velocity multiplied by the cross sectional area at the point of the measurement equals the air flow.

The precision that can be obtained with a pitot tube measuring system generally depends on the size, number, and position of the openings in the air stream. To obtain accurate measurements, it is generally desirable to have several pitot tubes or orifices located at various positions within the air flow. Otherwise, local variations in the velocity of the flow may result in an erroneous reading. However, each pitot tube creates a disturbance in the air flow, thereby increasing turbulence and resistance and decreasing efficiency.

Pitot tube measuring systems are generally more accurate when positioned in a region with a smaller cross-sectional area and, hence, higher velocity air flow. Positioning a pitot tube measuring system in such a location, however, also increases the negative impact of the pitot tube on the efficiency of the system.

A venturi tube measuring system is an example of an air flow measurement system that operates by constricting the air flow in the system. A typical venturi tube has an inlet diameter which narrows down to a throat of a smaller diameter. The smaller cross-sectional area at the throat results in an increase in air velocity. A pressure tap monitors the pressure at the inlet, and a second pressure tap monitors the pressure within the throat. This pressure differential is then used to estimate the flow rate.

A measuring system similar to the venturi tube may have a limited aperture for constricting the air flow within a conduit. A pressure sensor is generally located upstream from the aperture and another pressure sensor is located downstream from the aperture. The pressure differential can be used to determine the approximate air flow through the aperture. This type of flow sensor typically creates a significant pressure drop in the air stream that can dramatically reduce system efficiency.

Another constriction-type air flow sensor utilizes a nozzle having a flared inlet shaped much like a trumpet bell, and which smoothly narrows to a cylindrical throat having limited diameter and terminating at an outlet. The cylindrical throat has a constant circular cross-sectional profile over an extended length. Pressure measurements are taken at holes distributed along a portion of the cylindrical length. Air flow can then be calculated based upon a pressure comparison with the region upstream of the nozzle.

In general, the accuracy of both the obstruction-type measuring systems and the constriction-type flow measuring systems is increased by increasing the flow resistance. Of course, such increased flow resistance adversely impacts on the overall system efficiency.

SUMMARY OF THE INVENTION

Accordingly, it is an object of the present invention to provide an accurate air flow measuring system that does not significantly impair the efficiency of the system and that can precisely detect small changes in the air flow volume rate.

An air flow measuring system in accordance with one aspect of the invention serves as an inlet cone for a centrifugal fan. The inlet cone has a flared inlet, a narrow throat, and a flared outlet. A first set of one or more static pressure taps is positioned at or near the narrowest diameter of the throat to detect the pressure at the throat of the cone. A second set of one or more static pressure taps is positioned at or near the largest diameter of the flared inlet to detect the pressure at the inlet. The pressure differential between the two sets of taps is used to determine the air flow rate in accordance with an empirically determined formula.

In an alternative embodiment, a signal indicative of the air flow rate is provided to a controller that adjusts the fan speed to maintain a predetermined air flow rate.

Other objects and aspects of the invention will become apparent to those skilled in the art from the detailed description of the invention which is presented by way of example and not as a limitation of the present invention.

DESCRIPTION OF THE ILLUSTRATED EMBODIMENT

Figure 1:
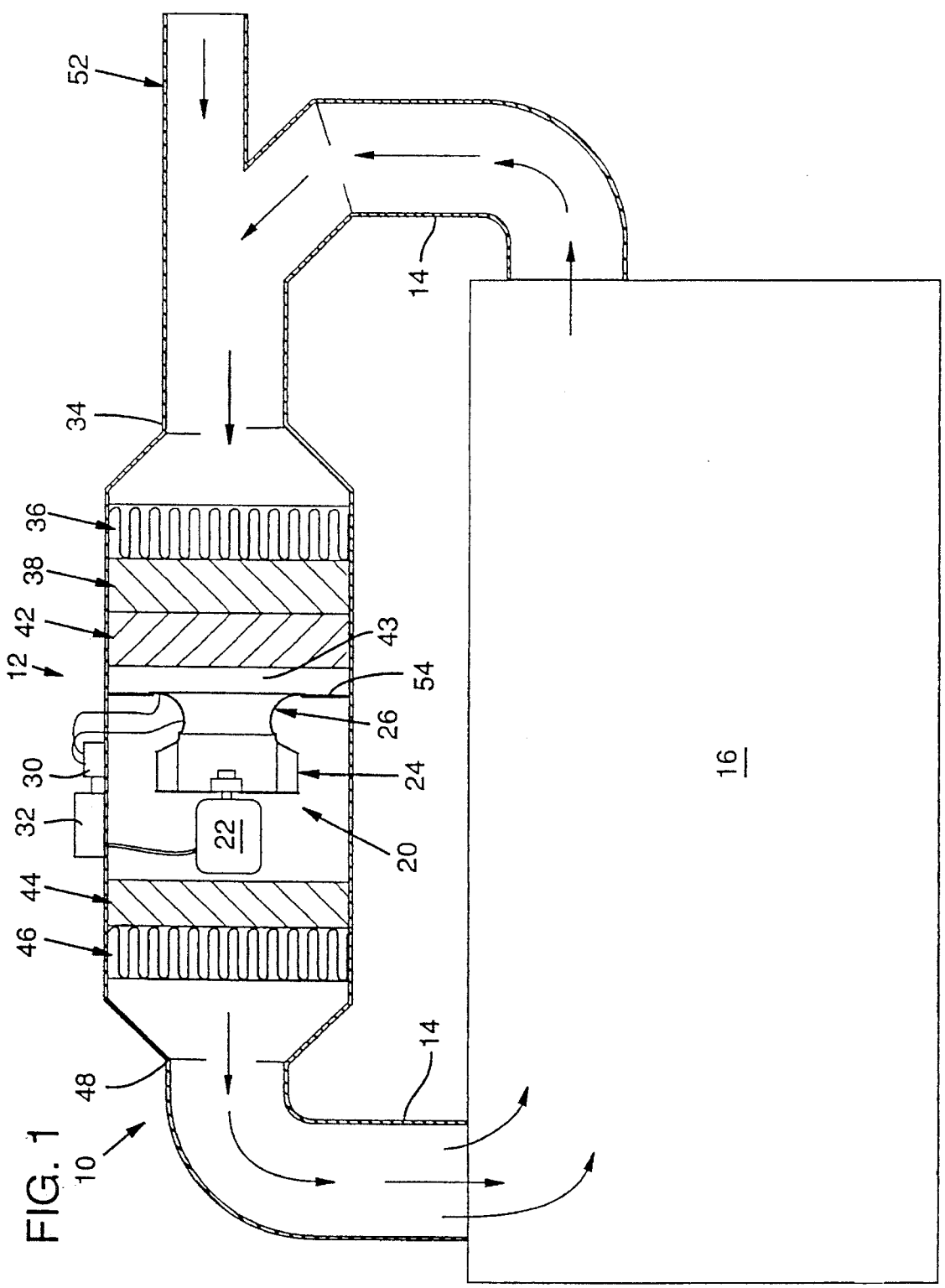
FIG. 1 is a schematic cross-sectional side view of a flow measuring system in accordance with a preferred embodiment of the invention as installed in a building ventilation system.

A ventilation system 10 including an air flow measuring system in accordance with a preferred embodiment of the present invention is illustrated in FIG. 1. The illustrated ventilation system 10 has a central air handler 12 that is connected by ductwork 14 to a building space 16. The central air handler 12 contains various components such as a filters 36, a heater unit 38, and a cooling coil 42, that condition the air as it circulates through the system. In this manner, air is drawn into the central air handler 10, where it is conditioned by the various components. The conditioned air is then circulated into the building to create a healthy and comfortable environment within.

Air is circulated through the ventilation system 10 by a centrifugal fan 20 that is positioned within the central air handler 12. The centrifugal fan has an inlet cone 26 which directs the air smoothly into a rotating fan wheel 24. An electric motor 22 drives the fan wheel to circulate air through the ventilation system 10 and into contact with the various air conditioning components.

To ensure that the air is properly conditioned, the air flow through the ventilation system 10 should be maintained at a specified level. Otherwise, the air within the building may become contaminated or the temperature or humidity within the building may vary outside of acceptable ranges.

To monitor air flow through the ventilation system, a pressure sensor 30 is connected to detect and compare the pressure at the flared inlet to the inlet cone and at the throat of the inlet cone. Based upon empirically determined characteristics of the inlet cone, the difference in pressure at these points can be used to determine the air flow through the inlet cone.

In an alternative embodiment of the present invention, a controller 32 is operably connected to the fan 20 and can adjust the fan speed in response to the actual air flow to maintain a preselected rate of air flow through the system. Alternatively, the controller may adjust an inlet damper to control the air flow volume. Of course, the controller need not automatically control an element of the system, but may simply comprise a display, gauge, recorder, or computer data storage system to permit monitoring of the system by human operators, enabling manual system adjustments.

The central station air handler 12 may include a wide variety of air processing components used for processing air in typical applications such as building ventilation and clean room air systems. Such components are generally arranged in series so that all air passing through the handler 12 passes sequentially through each of the components. In the illustrated example, air processed through the central station air handler 12 passes sequentially through: an air handler intake 34 connected to ductwork 14; an intake filter 36; an electric heater unit 38; a cooling coil 42; a plenum 43; the inlet cone 26; the bladed wheel 24; a sound trap 44; an output filter 46; and an outlet 48. The central station air handler 12 may also include other air processing components such as humidifiers.

In the illustrated system, each component has a given resistance to air flow. Some components, such as dampers or valves (not shown) may have selectably variable levels of flow resistance. The flow resistance of certain other components varies with use. For instance, filters become more resistant to air flow as they become clogged with particulate matter, and cooling coils may present a greater resistance to air flow as water condenses on their surfaces. Each component has an inherent "design" air flow resistance under worst case conditions, and a minimum resistance under ideal conditions. Each component has an "effective diameter" equivalent to the diameter of an orifice having the same airflow resistance.

Under normal operating conditions, a pressure drop occurs across each component. This pressure drop may be measured by comparing the pressure immediately upstream and downstream of each component. The pressure drop across the inlet cone 26 in one embodiment is equivalent to about 15 inches of water under normal operating conditions. Each of the other illustrated components has a pressure drop generally less than about one inch of water. Therefore, the pressure differential across the cone is substantially greater than that across any of the other components. Furthermore, in most cases, the pressure differential across the cone is greater than the sum total of the pressure drops across all other components in the entire system. Put another way, the inlet cone generally defines the highest velocity of airflow within the system. Because high velocity flow generates a low pressure, a pressure comparison between the cone's throat and an essentially static region in the system provides a significant, precisely measured value.

The inlet cone 26 has the smallest effective diameter of any system component. A set of narrow ducts transmitting flow through parallel paths at relatively low velocity is considered to be a single system component.

Ventilation systems may be created in innumerable configurations. The building space 16 may comprise a single room, or numerous rooms in one or more buildings. The ductwork 14 may include a network of branching ducts of various diameters so that air may flow through any number of alternative paths. The illustrated system also shows a fresh air intake duct 52 and may include any number of other intake and output apertures.

Figure 2:
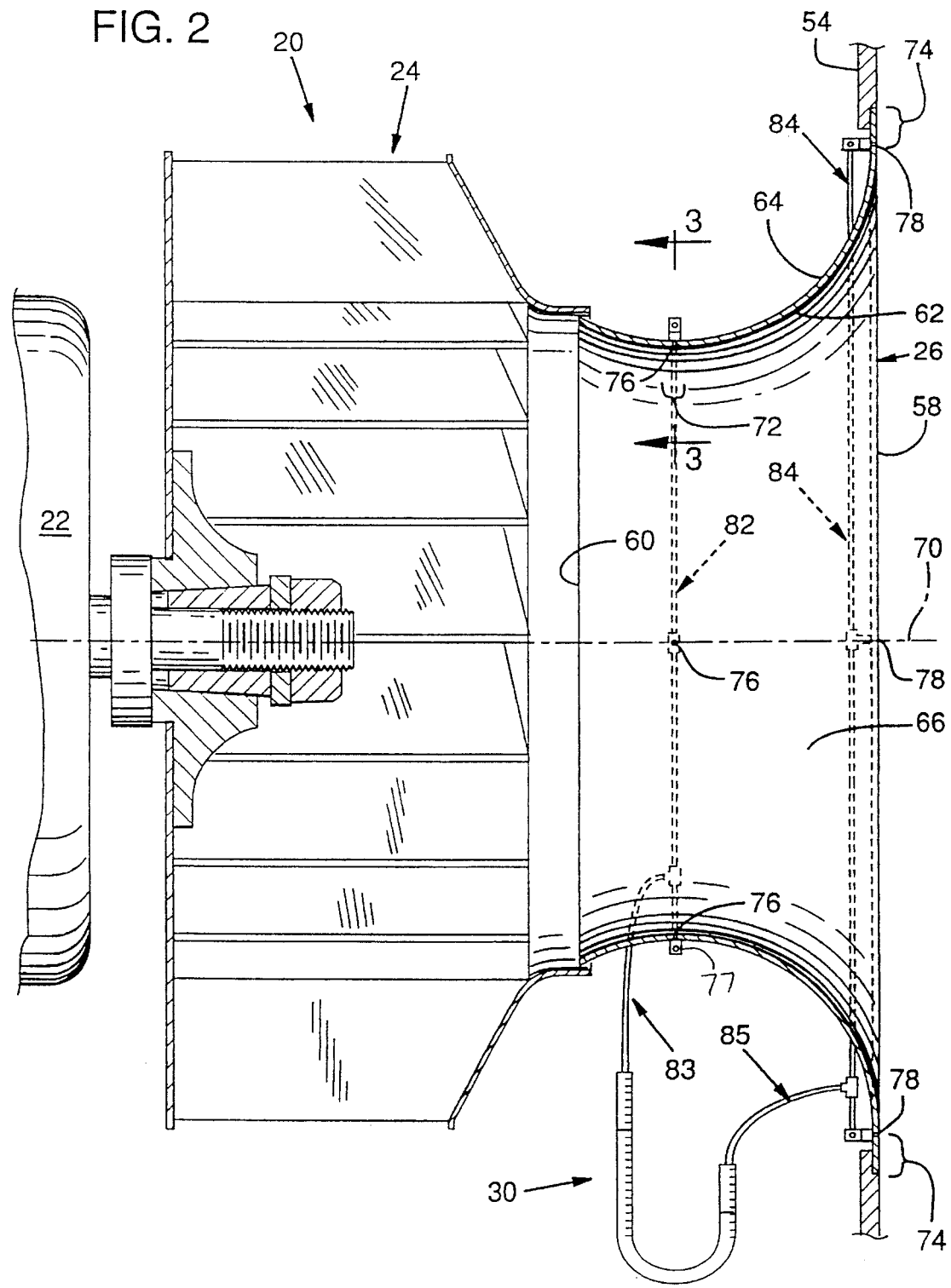
FIG. 2 is a detailed cross-sectional side view of the embodiment of FIG. 1.

As best shown in FIG. 2, the centrifugal fan 20 is arranged with the inlet cone 26 mounted flush with a plenum wall 54 so that all air reaching the fan 20 must pass through the inlet cone. As a result, a measurement of the air flow through the inlet cone is the same as a measure of the air flow through the entire system.

The inlet cone 26 includes a flared inlet 58, a narrow throat 72, and a flared outlet 60. The interior surface 62 of the inlet cone 26 defines a passage 66 centered on an axis 70, which is also the axis of rotation of the fan wheel 24. The interior surface 62 has a partly toroidal cross-section. Put another way, the surface 62 is defined as a surface of revolution of a circular arc segment about the axis 70. Generally speaking, the passage 66 is circular, with a diameter that is largest at the flared inlet 58 and smallest at the throat 72.

Because the outlet 60 is flared, the diameter at the outlet is larger than the diameter at the throat 72. In a cross-sectional plane that includes the axis 70, the profile of the cone is a curve having a constant radius over a major portion of its length. Thus, the throat portion 72 is a circular band having essentially no width. In practical terms, the throat portion may have a finite width extending beyond the theoretical region of minimum diameter.

At the flared inlet 58 the cone includes an annular flange 74 in a plane perpendicular to the axis 70. The toroidally curved portion of the cone makes a smooth tangential transition from the flat flange 74.

In the illustrated embodiment, the cone 26 is provided with four static pressure taps 76 for detecting the static pressure at the throat 72. These pressure taps do not interfere with the flow of air through the inlet cone and, hence, do not detract from the efficiency of the ventilation system. The pressure taps 76 are evenly distributed at 90° intervals around the narrowest throat region 72 of the cone. In embodiments of large size, the cone may be formed in two pieces, with a seam at the throat. In these cases, the pressure taps 76 are slightly offset away from the seam to facilitate manufacturability.

Figure 3:
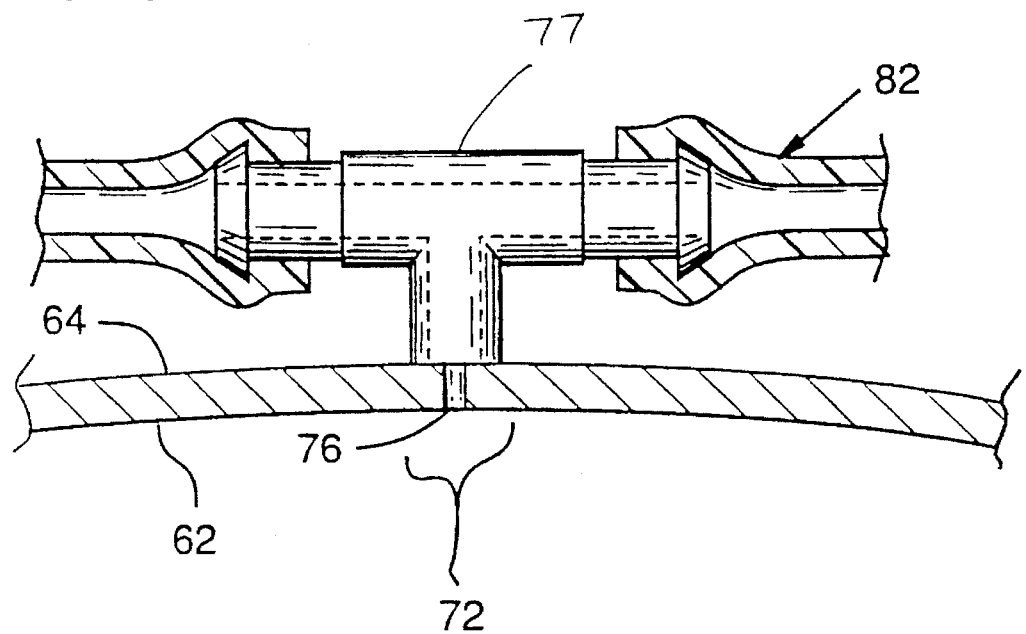
FIG. 3 is a fragmentary cross-sectional view of a pressure tap taken along line 3—3 of FIG. 1.

To ensure that the pressure taps accurately detect the static pressure, it is desirable that the surface of the cone be smooth and free from burrs or other obstructions in the vicinity of the pressure taps. As shown best in FIG. 3, the pressure taps should be generally perpendicular to the interior surface of the inlet cone. Ideally, the pressure taps should have a diameter less than one half of the thickness of the inlet cone.

Associated with each pressure tap is a fitting 77. In the illustrated embodiment, the fitting is a standard "T" fitting that is attached to the exterior of the inlet cone by soldering, brazing, or some other manner known to those skilled in the art. The fitting 77 is positioned so that the leg of the "T" is generally coaxial with the pressure tap 76. Care should be taken in affixing the fitting not to obstruct or interfere with the pressure tap 76.

Figure 4:
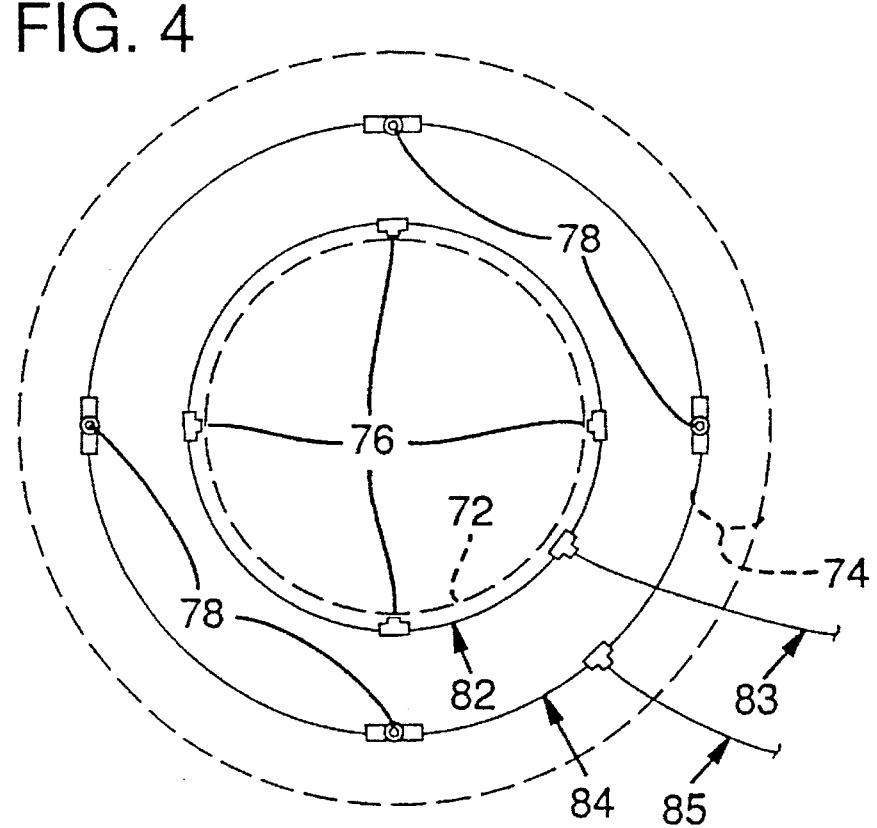
FIG. 4 is an axial view of the pressure transmission conduits of the embodiment of FIG. 1.

As illustrated in FIG. 4, the four fittings 77 associated with the throat pressure taps 76 are interconnected with sections of conduit 82. In this manner, the pressure within the conduit 82 is the average of the pressures at the four throat pressure taps 76. This system helps prevent inaccurate measurements that might result from local variations of the static pressure within the throat 72. In the illustrated embodiment, four pressure taps are used to detect the static pressure at the throat. This has been found to be adequate to produce accurate measurements in most cases. However, in some cases, it may be desirable to have a different number of pressure taps.

To measure the static pressure at the flared inlet 58, four face pressure taps 78 are distributed in a circular array at 90° intervals where the flange 74 transitions to the curved portion of the inlet cone 26. The face pressure taps 78 are generally similar in size and structure to the throat pressure taps 76. Like the throat pressure taps, a fitting 77 is associated with each face pressure tap 78 and the four fittings are connected by a conduit 84. In this manner, the pressure within conduit 84 is the average static pressure at the flared inlet 58.

As illustrated in FIG. 2, a shunt 83 is provided to connect conduit 82 to one side of a manometer 30. A similar shunt 85 connects conduit 84 to the other side of the manometer 30. Thus, the manometer 30 indicates the static pressure differential ($\Delta P$) between the flared inlet 58 and the throat 72.

It has been found that the difference between the static pressure at the throat 72 and at the flared inlet 58 is an indication of the air flow through the inlet cone 26. Theoretically, the pressure drop between any two locations in a ventilation system is influenced by a number of factors such as: the density of the air at each location, the flow characteristics of the air at each location, and the geometry of the ventilation system between the two locations. The measurement and calculation of all of the interrelated factors that contribute such a pressure drop can be extremely complicated and, for real world ventilation systems, impractical.

However, it been found that for air flows in the range typically associated with commercial ventilation systems, the largest contributing factors to the pressure drop between any two locations are typically: 1) the air flow characteristics of the geometry between the locations; and 2) the air flow rate. Thus, if the air flow characteristics of a given geometry are known, and if the static pressure differential across that geometry are known, it is possible to calculate, with a high degree of accuracy, the air flow rate.

In the flow measuring system of the present invention, the flow characteristics of a given size and shape of inlet cone can be empirically determined. That is, a given inlet cone can be placed in a laboratory test cell with a known flow rate (V) and the pressure drop ($\Delta P$) across the inlet cone measured. A flow rate coefficient (F) for the inlet cone can be determined in accordance with the following equation:
$F = V/\Delta P^{1/2}$ It has been found that F is relatively constant over the range of air flows typically found in commercial ventilation systems. As a result, once the value of F for a given cone has been empirically determined, that cone can be used to measure the air flow of any ventilation system in which it is a component by measuring the difference in static pressures ($\Delta P$) and solving the following equation:
$V = F * \Delta P^{1/2}$ An air flow measuring system in accordance with the present invention is particularly advantageous because it is integrated into a single component of the ventilation system, the inlet cone. As a result, the manufacturer of a particular size and model of inlet cone can perform the empirical evaluation of F for that cone. Thereafter, the cone can be used to accurately measure the air flow in any ventilation system in which it is used.

Moreover, because all of the instrumentation for measuring the static pressure differential is integrated into a single component, the likelihood of a measurement error is dramatically reduced. Measuring the static pressure at the flared inlet of the inlet cone and at the throat of the inlet cone ensures that the measured static pressure differential is the pressure drop across the inlet cone. If the pressure differential were measured at other locations, it may include pressure drops caused by factors or components other than the inlet cone. This could seriously degrade the accuracy of the air flow measurement.

The air flow measuring system of the present invention does not add an obstruction or constriction to the ventilation system. Rather, it uses a non-invasive technique for measuring the pressure drop across an existing element of the ventilation system—the inlet cone to the fan. As a result, the present air flow measuring system does not adversely affect the efficiency of the system.

Moreover, the pressure drop across the inlet cone is typically the largest single pressure drop in a ventilation system and a large pressure drop increases the accuracy of the air flow measurement. Accordingly, the structure of the present system results in an extremely precise air flow measurement without degrading system efficiency.

EXAMPLE

There are a wide variety of ways to incorporate the present air flow measuring system into a ventilation system. In an exemplary ventilation system, the fan wheel 24 and motor 22 are of a conventional nature. An example is disclosed in U.S. Pat. No. 4,859,140 to Passadore which is incorporated herein by reference. The motor shaft need not be coincident with the axis 70. The motor may be positioned at a separate location, with a belt drive mechanism transmitting power to the wheel 24. Alternatively, a double-width-double-inlet fan having two bladed wheels and two inlet cones may be employed without departing from the principles of the invention. The fan wheel 24 is preferably a backwardly inclined air foil type of impeller, although other centrifugal or axial fan impellers may be employed.

In the preferred embodiment, the inlet cone may have a throat diameter within, but not necessarily limited to, a range between 7.25 and 45 inches. Cones within this range will have corresponding flange outside diameters ranging between 14.25 and 81.5 inches, axial inlet-to-outlet lengths ranging between 3.8 and 22.5 inches, and profile radii ranging between 2.5 and 15.1 inches. Intermediate sizes and those beyond these exemplary range limits have generally proportional dimensions.

For an inlet cone of the type manufactured by Brod & McClung—Pace Co. for a 12.25 inch centrifugal fan, F has been found to be approximately 874 for air of standard density. Such an inlet cone has a flared inlet diameter of approximately 12.303 inches, a throat diameter of approximately 7.241 inches, and a flared outlet diameter of approximately 7.938 inches. It is a section of a toroid having a major diameter of approximately 12.303 inches and a minor diameter of approximately 2.531 inches. The length of the inlet cone is approximately 3.812 inches. The inlet cone is made of spun aluminum having a nominal thickness of approximately 0.125 inches.

Accurate measurements can be obtained with apertures having a diameter of approximately 0.047 inches with an inlet cone wall thickness of approximately 0.125 inches. An inside diameter of approximately 0.25 inches for the fittings 77 and the conduits 82 and 84 is satisfactory.

In the preferred embodiment, the pressure 30 includes a U-tube manometer Series 1227, available from Dwyer of Michigan City, Ind. and a transducer for generating a voltage proportional to the pressure within a range of 0–10 volts DC, and for delivering a current of 4–20 milliamps. The controller 32 is a Veltrol™ model 13000AZ indicating transmitter-controller from Air Monitor of Santa Rosa, Calif.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

I claim:

1. An air flow measuring inlet cone for a centrifugal fan within a ventilation system comprising:

an inlet cone defining a major passage for the passage of air, the inlet cone having a flared inlet with a first diameter, a narrow throat with second diameter smaller than the first diameter, and a flared outlet with third diameter smaller than the first diameter and larger than the second diameter, the inlet cone having an empirically determined constant representative of its flow characteristics;

a first static pressure tap for measuring the static pressure at the flared inlet;

a second static pressure tap for measuring the static pressure at the throat;

means for determining the air flow through the inlet cone based on the difference between the static pressure at the flared inlet and the static pressure at the throat and the empirically determined constant.

2. The inlet cone of claim 1 wherein the first pressure tap does not intrude into the major passage and the second pressure tap does not intrude into the major passage.

3. The inlet cone of claim 1 wherein the first pressure tap and the second pressure tap are both fixed to the inlet cone in a fixed relation to one another.

4. A method for measuring the air flow within a ventilation system having a centrifugal fan and an inlet cone:

measuring the static pressure at a first point of the inlet cone;

measuring the static pressure at a second point of the inlet cone different from the first point;

determining the pressure drop between the first and second points;

empirically determining a constant for the inlet cone that is representative of the air flow characteristics of the inlet cone; and calculating the air flow through the inlet cone.

5. A system for measuring a flow of air through a centrifugal fan comprising:

an inlet cone having a wall that is substantially the shape of the revolution of a portion of a circular arc about a central axis, the inlet cone defining a flared inlet having a first diameter through which the air flow enters the inlet cone and a narrow throat having a second diameter smaller than the first diameter through which the air flow passes to exit the inlet cone to the centrifugal fan, said inlet cone having an empirically determined flow rate coefficient;

one or more inlet taps positioned about the flared inlet for determining a static pressure of the air flow at the flared inlet;

one or more throat taps positioned about the narrow throat for determining a static pressure of the air flow at the narrow throat; and means for determining the air flow through the inlet cone based upon a difference between the static pressure of the air flow at the inlet and the static pressure of the air flow at the throat and the empirically determined flow rate coefficient.

6. The system of claim 5 in which the inlet taps and the throat taps are apertures provided in the wall of the inlet cone and do not extend into the inlet cone and do not obstruct the flow of air through the inlet cone, the apertures having a diameter that is less than about one-half their depth.

7. The system of claim 6 in which there are four inlet taps spaced approximately ninety degrees apart.

8. The system of claim 7 in which there are four throat taps spaced approximately ninety degrees apart.

9. The system of claim 8 in which the inlet taps are positioned adjacent the portion of the inlet cone having the maximum diameter and the throat taps are positioned adjacent the portion of the inlet cone having the minimum diameter.

10. The system of claim 5 wherein the empirically determined flow rate coefficient (F) is determined by passing a plurality of different known air flows (V) through the inlet cone and measuring the difference between the static pressure at the inlet and the static pressure at the narrow throat ($\Delta P$) for each of the plurality of known air flows and using the formula $F=V/\Delta P^{1/2}$.

11. A method for measuring the flow rate in a ventilation system having an inlet cone comprising the steps of:

fixing a first static pressure tap to the inlet cone at a first location for measuring static pressure at the first location;

fixing a second static pressure tap to the inlet cone at a second location for measuring static pressure at the second location;

determining a flow rate coefficient for the inlet cone having the first static pressure tap and the second static pressure tap fixed thereto;

installing the inlet cone with a determined flow rate coefficient in the ventilation system;

measuring a first static pressure at the first location using the first static pressure tap;

measuring a second static pressure at the second location using the second static pressure tap;

detecting a difference between the first static pressure and the second static pressure; and calculating the air flow through the inlet cone using the difference between the first static pressure and the second static pressure and the flow rate coefficient.

12. The method of claim 11 in which the determining step comprises passing a plurality of different known air flows (V) through the inlet cone and measuring the difference between the static pressure at the first static pressure tap and the static pressure at the second static pressure tap ($\Delta P$) for each of the plurality of known air flows and using the formula $F=V/\Delta P^{1/2}$.

* * * * *